US010983305B2

(12) United States Patent
Shields et al.

(10) Patent No.: US 10,983,305 B2
(45) Date of Patent: Apr. 20, 2021

(54) METHODS FOR CORRECTLY ORIENTING A SUBSTRATE IN A MICROSCOPE

(71) Applicant: Abbott Laboratories, Abbott Park, IL (US)

(72) Inventors: Trevor David Shields, Berwick (AU); Robert John Fahey, Elwood (AU); Damian J. Verdnik, McKinnon (AU); Svitlana Y. Berezhna, Los Gatos, CA (US); Mahmoud Janbakhsh, San Ramon, CA (US); Koshy T. Chacko, San Jose, CA (US)

(73) Assignee: Abbott Laboratories, Abbott park, IL (US)

( * ) Notice: Subject to any disclaimer, the term of this patent is extended or adjusted under 35 U.S.C. 154(b) by 114 days.

(21) Appl. No.: 16/512,856

(22) Filed: Jul. 16, 2019

(65) Prior Publication Data

US 2020/0003990 A1    Jan. 2, 2020

Related U.S. Application Data

(63) Continuation of application No. 15/041,717, filed on Feb. 11, 2016, now Pat. No. 10,393,997.

(60) Provisional application No. 62/117,858, filed on Feb. 18, 2015.

(51) Int. Cl.
*G02B 7/38* (2021.01)
*G02B 21/08* (2006.01)
*G02B 21/24* (2006.01)

(52) U.S. Cl.
CPC ............. *G02B 7/38* (2013.01); *G02B 21/088* (2013.01); *G02B 21/244* (2013.01); *G02B 21/245* (2013.01)

(58) Field of Classification Search
CPC ...... G02B 7/38; G02B 21/088; G02B 21/244; G02B 21/245; G02B 21/0056; G02B 21/16; G01N 21/6458; G01N 21/151436
See application file for complete search history.

(56) References Cited

U.S. PATENT DOCUMENTS

| | | |
|---|---|---|
| 4,435,079 A | 3/1984 | Hennick |
| 4,748,335 A | 5/1988 | Lindow et al. |
| 4,833,382 A | 5/1989 | Gibbs |
| 5,672,861 A | 9/1997 | Fairley et al. |
| 5,675,140 A | 10/1997 | Kim |
| 5,932,872 A | 8/1999 | Price |

(Continued)

FOREIGN PATENT DOCUMENTS

| | | |
|---|---|---|
| JP | A-H06-337357 | 12/1994 |
| JP | H-9218355 | 8/1997 |

(Continued)

*Primary Examiner* — Jennifer D Bennett
(74) *Attorney, Agent, or Firm* — Edward J. Baba; Bozicevic, Field & Francis LLP

(57) ABSTRACT

Methods, systems and devices for automatically focusing a microscope on a specimen and collecting a focused image of the specimen are provided. Aspects of the methods include detecting the presence of a substrate in a microscope, determining whether the substrate is in a correct orientation for imaging, focusing the microscope on a specimen that is placed on the substrate, and collecting one or more images of the specimen. Systems and devices for carrying out the subject methods are also provided.

20 Claims, 4 Drawing Sheets

(56) References Cited

U.S. PATENT DOCUMENTS

| | | | |
|---|---|---|---|
| 6,020,964 A * | 2/2000 | Loopstra | G03F 7/70775 |
| | | | 356/401 |
| 7,034,883 B1 | 4/2006 | Rosenqvist | |
| 7,390,997 B2 | 6/2008 | Tohma | |
| 7,634,188 B2 | 12/2009 | Pnueli et al. | |
| 7,667,890 B2 | 2/2010 | Maenle et al. | |
| 8,913,127 B2 | 12/2014 | Kotchou et al. | |
| 2002/0056345 A1 | 5/2002 | Ganser et al. | |
| 2004/0113043 A1 | 6/2004 | Ishikawa et al. | |
| 2005/0089208 A1 | 4/2005 | Dong et al. | |
| 2005/0121596 A1 | 6/2005 | Kam et al. | |
| 2006/0007531 A1 | 1/2006 | Korengut et al. | |
| 2007/0007428 A1 | 1/2007 | Ri | |
| 2009/0046298 A1 | 2/2009 | Betzig | |
| 2009/0060303 A1 | 3/2009 | Douglass et al. | |
| 2009/0086314 A1 | 4/2009 | Namba et al. | |
| 2009/0141278 A1* | 6/2009 | Tenney | B01L 3/545 |
| | | | 356/432 |
| 2009/0180179 A1 | 7/2009 | Ryu | |
| 2010/0214404 A1 | 8/2010 | Chen et al. | |
| 2011/0017902 A1 | 1/2011 | Hing et al. | |
| 2012/0019626 A1 | 1/2012 | Zhen et al. | |
| 2012/0140243 A1 | 6/2012 | Colonna de Lega | |
| 2013/0100272 A1 | 4/2013 | Azimi et al. | |

FOREIGN PATENT DOCUMENTS

| | | |
|---|---|---|
| JP | A-2005-274784 | 10/2005 |
| JP | A-2008-286584 | 11/2008 |
| WO | WO 02/39059 | 5/2002 |

\* cited by examiner

METHODS FOR CORRECTLY ORIENTING A SUBSTRATE IN A MICROSCOPE

CROSS-REFERENCE

This application is a continuation of U.S. patent application Ser. No. 15/041,717 filed Feb. 11, 2016, issued as U.S. Pat. No. 10,393,997, which claims the benefit of U.S. Provisional patent application Ser. No. 62/117,858 filed Feb. 18, 2015, which application is incorporated herein by reference in its entirety.

INTRODUCTION

Automated imaging of specimens using a microscope requires quickly and accurately determining an optimal focal position for any of a plurality of different substrates. Furthermore, an automated imaging system must be able to reliably handle different specimen types, whose image content may be variable across the substrate. In addition, automated imaging techniques need to be able to determine whether a substrate is present in a microscope, and whether the substrate is oriented correctly for imaging. The subject systems and methods address these and other needs.

SUMMARY

Methods, systems and devices for automatically focusing a microscope on a specimen and collecting a focused image of the specimen are provided. Aspects of the methods include detecting the presence of a substrate in a microscope, determining whether the substrate is in a correct orientation for imaging, focusing the microscope on a specimen that is mounted on the substrate, and collecting one or more images of the specimen. Systems and devices for carrying out the subject methods are also provided.

In some embodiments, a method for automatically focusing a microscope on a specimen involves placing a substrate substantially perpendicular to an optical axis of the microscope, wherein the substrate includes the specimen; directing a light beam from an optical source to reflect off the specimen to generate a reflected light beam; varying a distance between the substrate and an objective lens of the microscope; collecting a plurality of measurements of one or more characteristics of the reflected light beam with a detector, wherein each of the plurality of measurements is collected when the substrate is in a different position along the optical axis of the microscope with respect to the objective lens; determining which measurement has an optimal focal value; moving the substrate and/or the objective lens to an initial focus position that corresponds to the distance between the substrate and the objective lens from which the measurement for the reflected light beam has the optimal focal value; collecting a plurality of digital images of the substrate by moving the substrate and/or the objective lens along the optical axis above and/or below the initial focus position; analyzing at least a region of interest in each image to determine a focus metric for each image; determining which digital image has a best focus metric; and moving the substrate and/or the objective lens to a final focus position that corresponds to the position of the image with the best focus metric to automatically focus the microscope on the specimen.

In some embodiments, the optical source includes a laser. In some embodiments, the optical source includes a light emitting diode (LED). In some embodiments, the methods involve shaping a light beam from the optical source to create a collimated light beam. In some embodiments, the microscope includes two separate optical sources, a first optical source used for autofocusing and a second, separate optical source used for imaging. In some embodiments, the methods involve spectrally shifting a light beam from the first optical source with respect to a light beam from the second optical source. In some embodiments, the first optical source is a laser or an LED having an emission wavelength anywhere within a spectral range of 360 nm to 1,000 nm, and the second optical source is a white light source having an emission wavelength anywhere within a spectral range of 390 nm to 700 nm.

In some embodiments, the microscope includes at least two separate detection channels, wherein a first detection channel is used for autofocusing and a second, separate detection channel is used for imaging, and wherein the method involves separating a reflected light beam that is used for autofocusing from the second detection channel that is used for imaging. In some embodiments, the microscope includes a first detection channel that is used for autofocusing and up to 8 different imaging detection channels that are used for collecting at least a portion of a light beam coming from the specimen. In some embodiments, directing a light beam from the first optical source to reflect off the specimen to generate a reflected light beam involves introducing the light beam through an exit pupil at the rear of the objective lens to focus on the specimen, and collecting a reflected light beam passing through the same objective lens at the rear of an exit pupil. In some embodiments, directing a light beam from the optical source to reflect off the specimen to generate a reflected light beam involves reflecting the light beam from a front surface of the specimen facing the objective lens. In some embodiments, directing a light beam from the optical source to reflect off the specimen to generate a reflected light beam involves reflecting the light beam from a bottom surface of the specimen facing an opposite direction of the objective lens.

In some embodiments, the detection channel that is used for autofocusing includes a photodiode. In some embodiments, the detection channel that is used for imaging includes an image sensor device or a CCD camera. In some embodiments, the image sensor device is a color image sensor device or a color CCD camera. In some embodiments, a digital image of the specimen is a composite image that is formed from red, green, and blue (RGB) light that is collected by the color image sensor device or an RGB CCD camera.

In some embodiments, the methods involve placing a focusing lens at a rear side of the objective lens to focus the reflected light beam on the detector. In some embodiments, the methods involve placing a spatial aperture in a focal plane of a focusing lens in front of the detector to block an out-of-focus light beam that is reflected from one or more interfaces located above or below a focal plane of the specimen. In some embodiments, the spatial aperture has a variable diameter, and the methods involve varying the diameter of the spatial aperture.

In some embodiments, determining which measurement has the optimal focal value involves measuring an intensity of the reflected light beam. In some embodiments, determining which digital image has the optimal focus metric involves measuring an intensity in a red, green or blue digital image on a pixel by pixel basis. In some embodiments, determining which digital image has the best focus metric involves measuring an intensity in a greyscale image on a pixel by pixel basis. In some embodiments, determining which image has the best focus metric involves calculating a first derivative of an intensity of the digital image on a pixel by pixel basis. In some embodiments, determining which image has the best focus metric involves calculating a second derivative of an intensity of the digital image on a pixel by pixel basis. In some embodiments, determining which image has the best focus metric involves calculating a Fourier Transform of a digitized intensity image.

In some embodiments, the substrate includes a glass slide. In some embodiments, the specimen includes a biological sample. In some embodiments, at least a portion of the specimen has a variable thickness. In some embodiments, at least a portion of the specimen has an irregular surface. In some embodiments, at least a portion of the specimen has a variable reflectance value. In some embodiments, the specimen has a variable image content across one or more dimensions of the substrate.

In some embodiments, varying the distance between the substrate and the objective lens involves moving the substrate and/or objective lens at a variable rate. In some embodiments, varying the distance between the substrate and the objective lens involves moving the substrate and/or the objective lens at a constant rate. In some embodiments, collecting the plurality of images of the specimen from a plurality of positions along the optical axis with respect to the objective lens involves moving the substrate and/or the objective lens in a plurality of steps, wherein each step is equal to a depth of field of the microscope. In some embodiments, the depth of field of the microscope ranges from 0.15 µm to 10 µm.

In some embodiments, the methods involve determining a number of images to collect for finding the best focus position by dividing an uncertainty interval of the initial focus position by the depth of field of the objective lens used for imaging. In some embodiments, the number of images of the specimen that are collected ranges from 3 to 10. In some embodiments, an amount of time required to automatically focus the microscope on a location on the substrate is 2 seconds or less.

In some embodiments, the methods involve directing a light beam from an optical source toward a location where a substrate should be found to generate a reflected light beam if the substrate is present; measuring an intensity of the reflected light beam with a detector; and determining whether the intensity of the reflected light beam exceeds a threshold value to determine whether the substrate is present in the microscope.

In some embodiments, the methods involve placing a substrate substantially perpendicular to an optical axis of the microscope, wherein the substrate includes a planar surface; directing a light beam from an optical source to sequentially reflect off a first position and a second, different position on the planar surface to generate two reflected light beams, wherein the first position includes a non-reflective region and the second position includes a reflective region; varying a distance between the substrate and an objective lens of the microscope; collecting a plurality of measurements of one or more characteristics of the two reflected light beams with a detector, wherein each of the plurality of measurements is collected when the substrate is in a different position along the optical axis of the microscope with respect to the objective lens; determining whether the measurements of the two reflected light beams differ from one another by an amount that exceeds a threshold value; determining that the substrate is correctly oriented in the microscope if the measurements of the two reflected light beams differ from one another by an amount that exceeds the threshold value; and determining that the substrate is incorrectly oriented in the microscope if the measurements of the two reflected light beams do not differ from one another by an amount that exceeds the threshold value.

In some embodiments, collecting a plurality of measurements of one or more characteristics of the two reflected light beams involves measuring an intensity of the two reflected light beams. In some embodiments, the methods involve placing a focusing lens and a spatial aperture in front of the detector.

In some embodiments, the light beam from the optical source includes ultraviolet (UV) light, visible light, or infrared (IR) light. In some embodiments, the substrate includes a glass slide. In some embodiments, the light source includes a laser. In some embodiments, the light source includes a light emitting diode (LED).

In some embodiments, the methods involve shaping the light beam from the optical source to create a collimated light beam. In some embodiments, varying the distance between the substrate and the objective lens involves moving the substrate and/or the objective lens at a variable rate. In some embodiments, varying the distance between the substrate and the objective lens involves moving the substrate and/or the objective lens at a constant rate. In some embodiments, an amount of time required to automatically analyze the substrate orientation in the microscope is 1 second or less.

In some embodiments, the methods involve directing a first light beam from an optical source to reflect off a substrate at a first position to generate a first reflected light beam; measuring an intensity of the first reflected light beam with a detector; determining that the intensity of the first reflected light beam exceeds a threshold value to determine that the substrate is present in the microscope; directing a second light beam from the optical source to reflect off the substrate at a second, different position to generate a second reflected light beam, wherein the second position includes a non-reflective region; varying a distance between the substrate and an objective lens of the microscope; collecting a plurality of measurements of one or more characteristics of the first and second reflected light beams with a detector, wherein each of the plurality of measurements is collected when the substrate is in a different position along an optical axis of the microscope with respect to the objective lens; determining that the measurements of the first reflected light beam differ from the measurements of the second reflected light beam by an amount that exceeds a threshold value, thereby determining that the substrate is correctly oriented in the microscope; collecting a plurality of measurements of one or more characteristics of the first reflected light beam with a detector, wherein each of the plurality of measurements is collected when the substrate is in a different position along the optical axis of the microscope with respect to the objective lens; determining which measurement has an optimal focal value; moving the substrate and/or the objective lens to an initial focus position that corresponds to the distance between the substrate and the objective lens from which the measurement for the first reflected light beam has the optimal focal value; collecting a plurality of digital images of the substrate by moving the substrate and/or the objective lens along the optical axis above and/or below the initial focus position; analyzing at least a region of interest in each image to determine a focus metric for each image; determining which digital image has a best focus metric; and moving the substrate and/or the objective lens to a final focus position that corresponds to the position of the image with the best focus metric to automatically focus the microscope on the specimen. In some embodiments, an amount of time required to automatically focus the microscope on the specimen is 2 seconds or less.

BRIEF DESCRIPTION OF THE DRAWINGS

The invention may be best understood from the following detailed description when read in conjunction with the accompanying drawings. Included in the drawings are the following figures.

DETAILED DESCRIPTION

Figure 1:
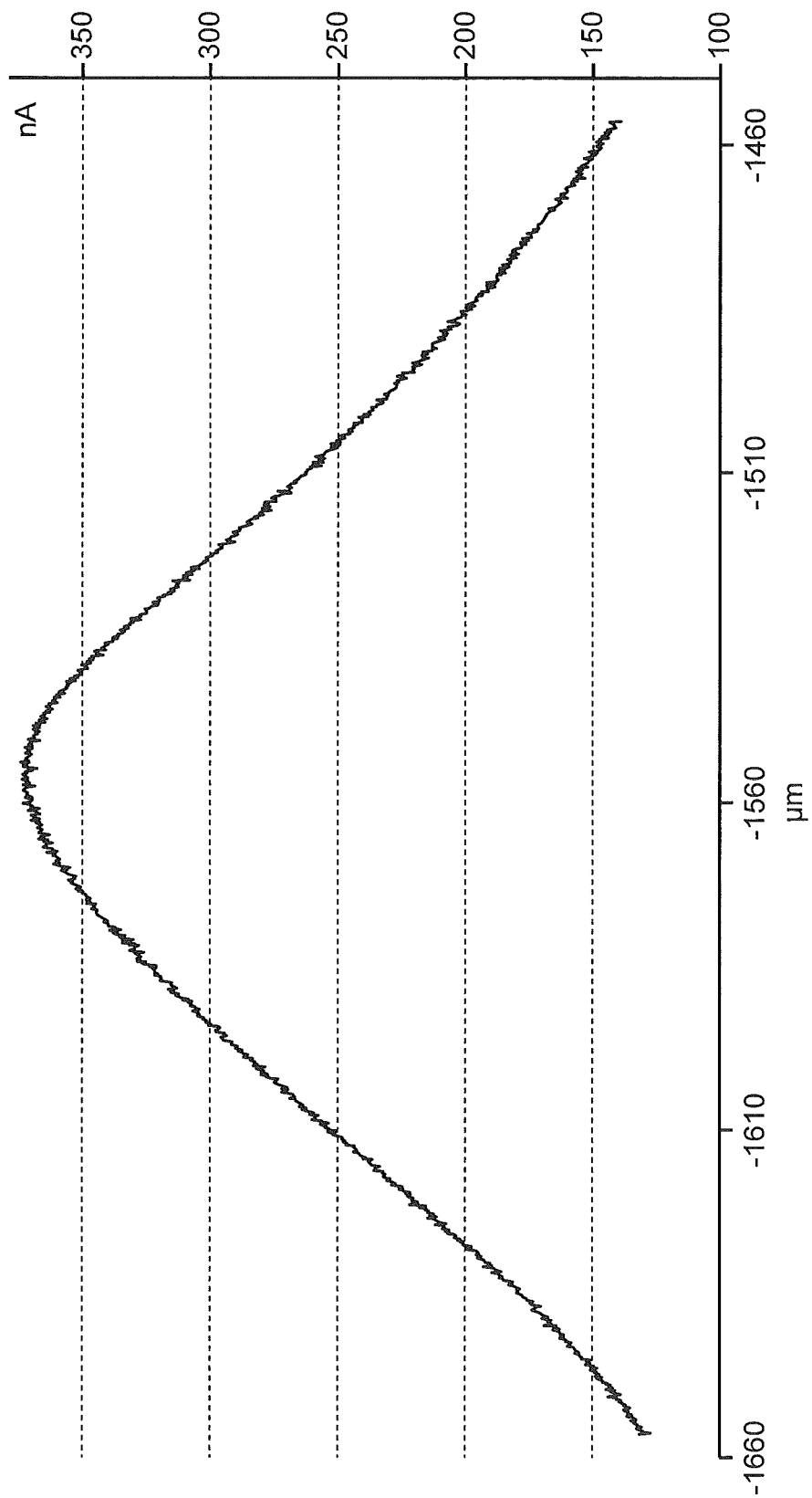
FIG. 1 is a graph showing a reflected light signal in units of photodiode counts collected upon reflection from a substrate as a function of z-axis position of the substrate, wherein the z-axis is parallel to the optical axis of the microscope.

Methods, systems and devices for automatically focusing a microscope on a specimen and collecting a focused image of the specimen are provided. Aspects of the methods include detecting the presence of a substrate in a microscope, determining whether the substrate is in a correct orientation for imaging, focusing the microscope on a specimen that is placed on the substrate, and collecting one or more images of the specimen. Systems and devices for carrying out the subject methods are also provided.

Before the present invention is described in greater detail, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Certain ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating unrecited number may be a number which, in the context in which it is presented, provides the substantial equivalent of the specifically recited number.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

In further describing various aspects of embodiments of the invention in greater detail, aspects of the systems and devices of various embodiments are reviewed first in greater detail, followed by a discussion of methods and kits according to certain embodiments of the invention.

Methods

Methods in accordance with embodiments of the invention may be used for automatically detecting whether a substrate (e.g., a microscope slide) is present in a microscope; detecting whether a substrate is oriented correctly in a microscope for imaging analysis; focusing a microscope on a specimen that is placed on the substrate; and collecting one or more images of the specimen. In some embodiments, the subject methods can be carried out using automated equipment, wherein the equipment is configured to automatically carry out each of the method steps. In some embodiments, one or more steps of the subject methods can be carried out manually, e.g., by an operator. For example, in some embodiments, an operator may carry out a portion of the subject methods, and the remaining method steps may be carried out using, e.g., automated equipment that is configured to carry out at least a portion of the subject method steps. Aspects of the subject methods are described in further detail below.

In some embodiments, the subject methods involve determining whether a substrate is present in a microscope by directing a light beam from an optical source of the microscope toward a location where a substrate should be found if it is present in the microscope. If the substrate is present, the light beam is reflected off the substrate to generate a reflected light beam. An intensity of the reflected light beam is then measured using a detector, and the measured intensity is compared to a threshold value. If the measured intensity of the reflected light beam exceeds the threshold value, then the substrate is determined to be present in the microscope. If the measured intensity of the reflected light beam does not exceed the threshold value, then the substrate is determined to be absent from the microscope. In some embodiments, the threshold intensity value used to determine whether a substrate is present in the microscope ranges from 40-510 nA as measured by a photodiode.

In some embodiments, the subject methods involve automatically analyzing a substrate to determine whether the substrate is correctly oriented on the microscope's specimen holder for imaging. By "correctly oriented" is meant that the substrate is placed on the specimen holder of the microscope such that a surface of the substrate upon which the microscope is to be focused is facing up toward the objective lens of the microscope. In some embodiments, methods for determining whether a substrate is correctly oriented on the microscope holder involve directing a light beam from an optical source to sequentially reflect off the substrate surface at two different positions which vary in reflectance. In some embodiments, two reflected light beams are generated, one from a non-reflective region of the substrate, and another one from a reflective region of the substrate.

A light beam that has been reflected off the non-reflective region of the substrate will have a characteristic (e.g., an intensity value) that is different from that of a light beam that has been reflected off a reflective region (e.g., an un-altered surface of a glass slide) of the substrate. As such, one or more characteristics of the first and second reflected light beams can be compared to each other, and the difference in the characteristics can be quantified. For example, in some embodiments of the subject methods, the intensity of the reflected light beams from the reflective and non-reflective regions of the substrate can be compared to each other, and the value of the difference is compared to a threshold value to determine whether the substrate orientation is correct.

If the measurements from the two reflected light beams differ from one another by an amount that exceeds a threshold value, then the substrate is determined to be in a correct orientation in the microscope. If the measurements from the two reflected light beams do not differ from one another by an amount that exceeds the threshold value, then the substrate is determined to be in an incorrect orientation in the microscope. In some embodiments, the subject methods involve varying a distance between the substrate and an objective lens of the microscope in order to move the substrate through a plurality of different positions along the optical axis of the microscope. Moving a substrate through a plurality of different positions along the optical axis of the microscope can be accomplished by moving the substrate, moving the objective lens, or moving both the substrate and the objective lens so that a distance between the substrate and the objective lens is modulated (e.g., is increased or decreased). While the substrate is being moved through a plurality of positions along the optical axis of the microscope, a plurality of measurements of one or more characteristics of one or more reflected light beams can be collected using one or more detectors.

In some embodiments, the measurements from each of two reflected light beams are compared in order to quantify a difference between the measurements. In some embodiments, the subject methods involve varying the distance between the substrate and an objective lens of the microscope at a constant rate, where in certain embodiments the rate ranges from 100-500 µm/s, such as 150, 200, 250, 300, 350, 400 or 450 µm/s. In some embodiments, the subject methods involve varying the distance between the substrate and an objective lens of the microscope at a variable rate. For example, in some embodiments, the subject methods involve varying the distance between the substrate and an objective lens of the microscope at a first rate, ranging from 100-500 µm/s, such as 150, 200, 250, 300, 350, 400 or 450 µm/s, for a first period of time, and varying the distance between the substrate and an objective lens of the microscope at a second rate, ranging from 100-500 µm/s, such as 100, 150, 200, 250, 300, 350, 400 or 450 µm/s, for a second period of time. In some embodiments, the subject methods for automatically determining whether a substrate is correctly oriented in a microscope are carried out in 2 seconds or less, or 1 second or less.

In some embodiments, the subject methods involve placing a focusing lens and a spatial aperture (described further below) in front of a detector, such that a light beam passes through the focusing lens and the spatial aperture before reaching a detector. In some embodiments, a spatial aperture includes an aperture whose size (e.g., diameter) ranges from 50 µm to 500 µm, such as 100, 150, 200, 250, 300, 350, 400 or 450 µm. In some embodiments, a spatial aperture includes an aperture whose size (e.g., diameter) is variable, and the subject methods involve varying the diameter of the spatial aperture to vary a portion of a light beam that is allowed to pass through the aperture. In certain embodiments, the subject methods involve varying the diameter of a spatial aperture from 50 µm to 500 µm, such as 100, 150, 200, 250, 300, 350, 400 or 450 µm.

The subject methods for determining whether a substrate is correctly oriented in a microscope can be conducted using light from any of a variety of suitable monochromatic optical sources (described further below). In some embodiments, light from an optical source may include ultraviolet light, having a wavelength that ranges from 360 to 420 nm. In some embodiments, light from an optical source may include visible light (e.g., white light), having a wavelength that ranges from 420 to 700 nm. In some embodiments, light from an optical source may include near infrared light, having a wavelength that ranges from 700 nm to 1 µm.

In some embodiments, the subject methods involve automatically focusing a microscope on a specimen, wherein the methods involve moving the substrate and/or an objective lens of the microscope to an initial focus position along the optical axis of the microscope located within close proximity (e.g., located within an interval of a few depths of field) to the best focus position, collecting a plurality of digital images of the substrate taken at different coordinates along the optical axis within a search interval, analyzing the collected images, and determining which image has the best focus metric to find the best focus position. In some embodiments, a search interval is equal to less than 10 times the depth of field for the objective lens. By "depth of field" is meant the axial, or longitudinal, resolving power of the objective lens of the microscope in a direction that is parallel to the optical axis of the microscope, which is determined by the numerical aperture of the objective lens. The image with the best focus metric corresponds to the best focus position of the microscope for the given objective lens. Each of these aspects of the subject methods are described in further detail below.

In some embodiments, the methods involve generating and measuring one or more characteristics of the reflected light beam from the substrate that is used to find an initial focus position. In certain embodiments, the methods involve directing a light beam from a suitable optical source toward the substrate to reflect off the specimen and generate a reflected light beam. The distance between the substrate and an objective lens of the microscope is varied by moving either the substrate or an objective lens, or both, along the optical axis within a specified interval, and a plurality of measurements of one or more characteristics of the reflected light beam is collected. The collected measurements are analyzed to determine which measurement has a peak value. By "peak value" is meant a measurement from a reflected light beam having a maximum intensity value as a function of the position of the substrate along the optical axis of the microscope with respect to the position of the objective lens. Once the peak position (corresponding to the axial coordinate of the maximum intensity value of the reflected beam) is located, the substrate and/or objective lens can be moved to this position (or within close proximity either above or below this position), which becomes an initial position for use in further searching to identify the best focus position.

As reviewed above, in some embodiments, the subject methods involve varying the distance between the substrate and an objective lens of the microscope at a constant rate, where in certain embodiments the rate ranges from 100-500 $\mu$m/s, such as 150, 200, 250, 300, 350, 400 or 450 $\mu$m/s. In some embodiments, the subject methods involve varying the distance between the substrate and an objective lens of the microscope at a variable rate. For example, in some embodiments, the subject methods involve varying the distance between the substrate and an objective lens of the microscope at a first rate ranging from 100-500 $\mu$m/s, such as 150, 200, 250, 300, 350, 400 or 450 $\mu$m/s, for a first period of time, and varying the distance between the substrate and an objective lens of the microscope at a second rate ranging from 100-500 $\mu$m/s, such as 150, 200, 250, 300, 350, 400 or 450 $\mu$m/s, for a second period of time. Typically, a faster rate corresponds to movement within an interval located further below or above the initial focus position, whereas a slower rate corresponds to movement within an interval which is closer to the initial focus position. For example, if a search interval is equal to 400 $\mu$m (starting at 200 $\mu$m below and finishing at 200 $\mu$m above the initial focus position), for the movement within the interval of 200 $\mu$m-50 $\mu$m below the initial focus position and 50 $\mu$m-200 $\mu$m above the initial focus position, the rate can be 200 $\mu$m/s, while for the movement within the interval 50 $\mu$m below and 50 $\mu$m above the initial focus position, the rate can be 100 $\mu$m/s.

In some embodiments, the subject methods involve shaping a light beam before it reaches a detector in order to control and/or modulate a portion of the light beam that reaches the detector for analysis. As such, in some embodiments, aspects of the methods involve placing a focusing lens and a spatial aperture (described further below) in front of a detector, such that a light beam passes through the focusing lens and the spatial aperture before reaching a detector. In some embodiments, a spatial aperture includes an aperture whose size (e.g., diameter) ranges from 50 to 500 $\mu$m, such as 100, 150, 200, 250, 300, 350, 400 or 450 $\mu$m. In some embodiments, a spatial aperture includes an aperture whose size (e.g., diameter) is variable, and the subject methods involve varying the diameter of the spatial aperture to vary a portion of a light beam that is allowed to pass through the aperture. In certain embodiments, the subject methods involve varying the diameter of a spatial aperture from 50 to 500 $\mu$m, such as 100, 150, 200, 250, 300, 350, 400 or 450 $\mu$m.

The subject methods for automatically focusing a microscope on a specimen and collecting one or more digital images of the specimen can be conducted using monochromatic light from any of a variety of suitable optical sources (described further below). In some embodiments, light from an optical source may include ultraviolet light, having a wavelength that ranges from 360 nm to 400 nm. In some embodiments, light from an optical source may include visible light (e.g., white light), having a wavelength that ranges from 400 to 700 nm. In some embodiments, light from an optical source may include near infrared light, having a wavelength that ranges from 700 nm to 1,000 nm.

In some embodiments, the subject methods are carried out using a microscope that has separate optical sources used for autofocusing and imaging. In some embodiments, the optical sources used for autofocusing and imaging may include the same type of light, e.g., may both include laser light or LED light of the same wavelength. In some embodiments, the optical source that is used for autofocusing includes light whose wavelength is different from that of the optical source that is used for imaging. For example, in certain embodiments, the subject methods involve using a near infrared (or ultraviolet) light beam for autofocusing, while a visible light with a broad spectrum (white light source) is used for imaging.

In certain embodiments, the subject methods involve shaping a light beam from an optical source to create a collimated light beam. By "collimated light beam" is meant a light beam whose rays are substantially parallel to one another, and therefore spread minimally as the light beam moves through space. In certain embodiments, one or more optical components may be used to shape a light beam from the optical source into a collimated light beam. For example, in some embodiments, a collimating lens or a combination of several lenses may be positioned in the path of a light beam and used to shape the light beam from the optical source into a collimated light beam.

In some embodiments, a microscope used for conducting the subject methods includes at least two separate detection channels, one detection channel for autofocusing, and another one for imaging; thereby separating autofocusing and imaging signals and directing them toward different detectors. In certain embodiments, the number of detection channels for imaging can be more than one, wherein the light beam coming out of the specimen being split into several detection channels as needed by certain different applications. For example, if a fluorescence signal is collected for imaging of the specimen, the microscope can include one detection channel for autofocusing and as many as 8 different detection channels for imaging.

In some embodiments, the subject methods involve directing a reflected light beam to follow a specified path. For example, in some embodiments, a light beam can be directed to reflect off a specimen by introducing the light beam into an exit pupil located at the rear of the objective lens. After entering the objective lens through the exit pupil, the light beam reflects off the specimen to create a reflected light beam. In certain embodiments, the reflected light beam is then directed back towards and is collected by the same objective lens, exiting through the rear of the objective into the detection channel for analysis.

In some embodiments, the subject methods involve directing a light beam to reflect off a substrate's front surface (the surface facing the objective lens). In other embodiments, the subject methods involve directing a light beam to reflect off a substrate's bottom surface (the surface located below or above the front surface and facing in the opposite direction of the objective lens).

Once a substrate has been moved to an initial focus position, aspects of the methods involve moving the substrate and/or the objective lens along the optical axis to a plurality of different positions and collecting a plurality of digital images of the specimen from each of the different positions. In some embodiments, the subject methods involve moving the substrate and/or the objective lens of the microscope in specific distance increments along the optical axis of the microscope. In certain embodiments, the size of each step is equal to the depth of field of the microscope. In some embodiments, the depth of field of a microscope used to carry out the subject methods ranges from 0.15 to 10 μm, and as such, in some embodiments, the size of each step used for collecting a plurality of digital images ranges from 0.15 to 10 μm, such as 0.25, 0.5, 1, 2, 3, 4, 5, 6, 7, 8 or 9 μm.

Aspects of the subject methods involve determining how many digital images of a specimen to collect along the optical axis of the microscope. In certain embodiments, determining the number of digital images to collect involves dividing an uncertainty or a search interval of the initial focus position by the depth of field of the objective lens used for imaging. By "uncertainty interval" or "search interval" of the initial focus position is meant a distance over which the change in a measured characteristic of a reflected light beam (e.g., the change in the intensity of the reflected light beam) used to determine the initial focus position is not greater than signal noise. See, e.g., FIG. 2. For instance, for a given substrate, if an intensity peak used to determine the initial focus position for the substrate is relatively thin and sharp, or distinct, then the uncertainty interval will be small. In contrast, if the intensity peak for a given substrate is relatively broad and flat, then the uncertainty interval will be larger. In some embodiments, the number of digital images of the specimen that are collected ranges from 3 to 10, such as 4, 5, 6, 7, 8 or 9. For example, if the uncertainty interval for a 20× objective lens with a numerical aperture of 0.5 is determined to be 10 μm, and the depth of field is 2 μm, then the total number of images to be collected is 10 divided by 2, which is 5; with 1 image collected at the initial focus position and 2 images collected on each side of the initial focus position (2 images below and 2 images above the initial focus position).

In some embodiments, aspects of the methods involve collecting an entire digital image corresponding to the full field of view of the objective lens. In certain embodiments, aspects of the methods involve collecting only a predefined section of the image (e.g., a region of interest, ROI) by selecting only a section of the field of view. An ROI can have variable dimensions and cover as little as 2×2 pixels area up to a full size image. For example, if the size of the detector is 1936×1456 pixels, an ROI can have variable dimensions anywhere in the range from 2 pixels to 1936 pixels in one direction and 2 pixels to 1456 pixels in other direction, respectively.

Aspects of the methods involve analyzing the collected digital images to determine which image has a best focus metric. By "best focus metric" is meant a measurement or characteristic of the digital image that is greater than or superior to the same measurement or characteristic in all other collected digital images in the data set. In some embodiments, aspects of the methods involve performing a digital image analysis on each of the collected digital images using one or more analysis algorithms. In certain embodiments, aspects of the methods involve analyzing a digital image of the specimen on a pixel-by-pixel basis, wherein each individual pixel of the digital image is analyzed. The results of the analysis for each pixel are then summed, or totaled, to determine a characteristic of the digital image which can then be compared to the same characteristic determined for the other collected digital image(s) to determine which digital image has a best focus metric.

In some embodiments, analyzing a digital image of the specimen using a computer processor involves measuring an intensity (e.g., a greyscale intensity) of the entire image on a pixel by pixel basis In some embodiments, aspects of the methods involve calculating a first derivative of an intensity of a digital image on a pixel by pixel basis. In some embodiments, aspects of the methods involve calculating a second derivative of an intensity of a digital image on a pixel by pixel basis. In some embodiments, aspects of the methods involve calculating a Fourier Transform of the digitized intensity image. In some embodiments, an image sensor includes a color image sensor that is configured to create a digital image of the specimen that is formed from red, green and/or blue light that is collected by the color image sensor. In such embodiments, aspects of the methods involve measuring an intensity of the red, green and/or blue digital image of the specimen on a pixel by pixel basis.

In some embodiments, analyzing a digital image of the specimen using a computer processor involves measuring an intensity (e.g., a greyscale intensity) of the selected region of interest (ROI) within a microscope field of view on a pixel by pixel basis. In some embodiments, aspects of the methods involve calculating a first derivative of an intensity of an ROI on a pixel by pixel basis. In some embodiments, aspects of the methods involve calculating a second derivative of an intensity of an ROI on a pixel by pixel basis. In some embodiments, aspects of the methods involve calculating a Fourier Transform of the ROI. In some embodiments, one or more ROIs for further analysis can be selected from different color images (e.g., red, green, or blue color images) and combined in a suitable manner by image processing to create a suitable focus metric calculating algorithm for a certain application.

In some embodiments, the subject methods for automatically focusing a microscope on a specimen and collecting a digital image of the specimen having a best focus metric are carried out in 5 seconds or less, such as 4 seconds or less, 3 seconds or less, 2 seconds or less, or 1 second or less.

The subject methods find use in automatically analyzing a plurality of specimens using a microscope. For example, the subject methods may be used to automatically determine whether a substrate (e.g., a microscope slide) is present in a microscope, and whether the substrate is correctly oriented in the microscope. In addition, the subject methods find use in automatically focusing the microscope on a specimen that is mounted on the substrate, and collecting a digital image of the specimen that has an optimal focus metric. The digital image of the specimen having a best focus metric is an image that has the best possible sharpness, or clarity (e.g., the same sharpness or clarity as can be achieved by manual focusing) and is suitable for further analysis, e.g., can be used to conduct a further analysis of one or more portions of the specimen, or that can be reviewed by an operator or clinician. As such, the subject methods can be used to automatically process a plurality of substrates through an imaging analysis procedure wherein each substrate is placed on the specimen holder of a microscope, the microscope is focused on a specimen on the substrate, and a digital image having a best focus metric is collected by the microscope to create a digital image of the specimen that is suitable for further analysis.

Referring now to FIG. 1, a graph of a reflected signal (measured in photodiode counts) collected by the photodetector upon reflection from the substrate as a function of z-axis position (wherein the z-axis is parallel to the optical axis of the microscope) of the substrate is shown. A beam of light from an optical source has been directed to reflect off the substrate at a defined location (e.g., a location that includes bare glass or a specimen) and a reflected light beam has been directed to a detection channel that included a photodiode detector. As the substrate is moved along the optical axis of the microscope from the initial search position, located either above or below the expected focus position by a certain interval, the graph of the photodiode counts shows a relative maximum value, or peak value, that corresponds to the position of the substrate in the optical axis of the microscope having a highest intensity of the reflected signal. The highest intensity in the reflected beam is generated when a substrate passes through the focus position of the objective lens and a light beam on the surface is focused into the smallest spot. Once the z-position of the relative maximum value has been determined, the substrate and/or the objective lens are moved to place the substrate in the position either corresponding to the peak, or above/below the peak position within an uncertainty interval (as discussed further with respect to FIG. 2, below).

Figure 2:
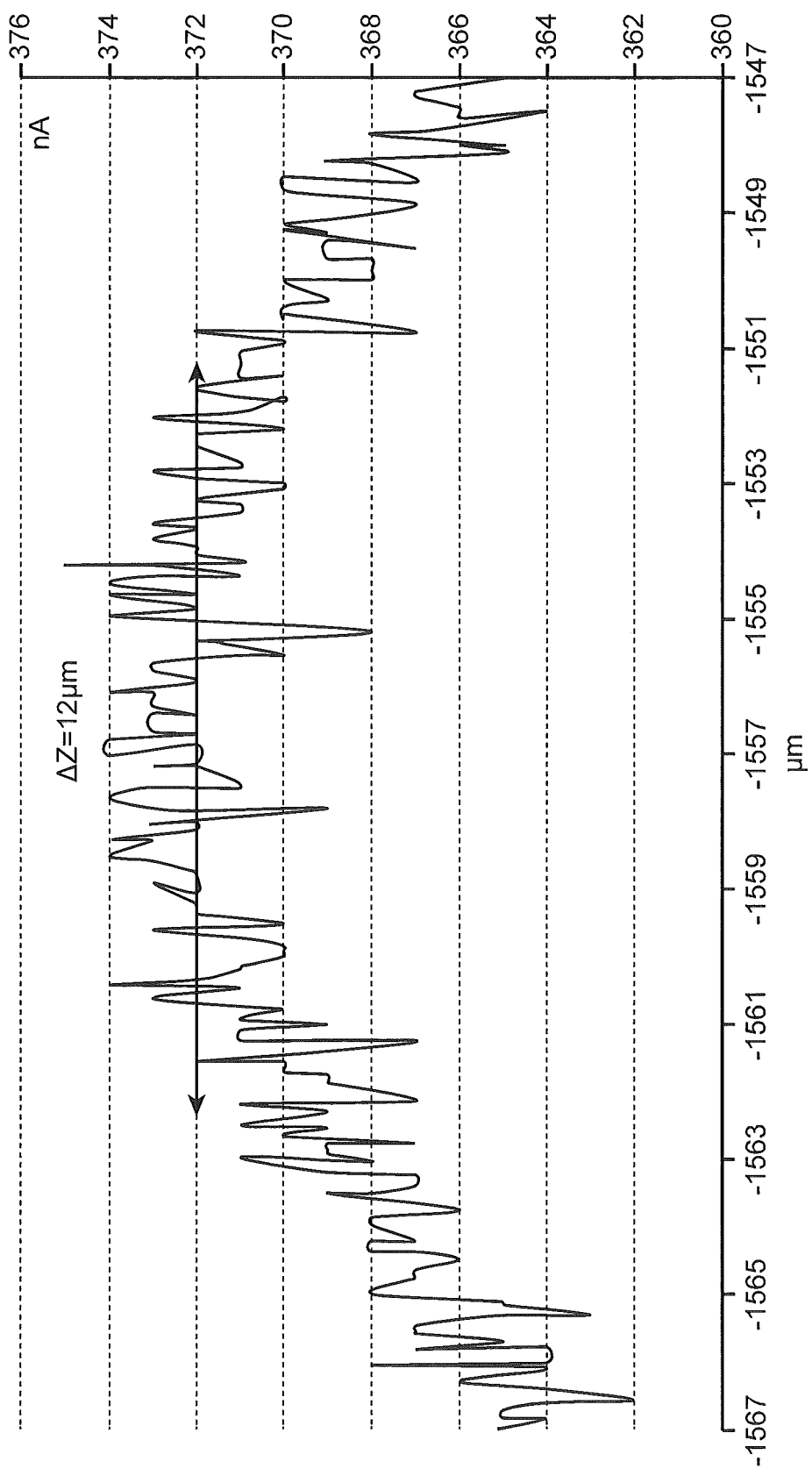
FIG. 2 is a graph showing an uncertainty, or search interval in determining a z-coordinate of a peak position in a photodiode signal due to noise.

Referring now to FIG. 2, a graph of a reflected signal (measured in photodiode counts) collected by the photodetector upon reflection from the substrate as a function of z-axis position of the substrate is shown. A beam of light from an optical source has been directed to reflect off the substrate at a defined location (e.g., a location that includes bare glass or a specimen) and a reflected light beam has been directed to a detection channel that included a photodiode detector. As the substrate is moved along the optical axis of the microscope, the graph of the photodiode counts shows a relative maximum value, or peak, that corresponds to the position of the substrate in the optical axis of the microscope having the highest intensity of the reflected beam. The uncertainty interval for the peak position is shown by the double-headed arrow, and in the depicted graph represents a difference in z-position ($\Delta Z$) of 12 µm.

Systems and Devices

Aspects of the invention include systems and devices thereof configured to carry out the subject methods, e.g., to automatically focus a microscope on a specimen and collect a digital image of the specimen. Various components of the subject systems and methods are described in detail below.

Aspects of the subject system include optical microscopes that are configured to carry out the subject methods. Microscopes in accordance with embodiments of the invention include at least one objective lens, at least one optical source, and at least one detection channel. Objective lenses in accordance with embodiments of the invention are configured to collect light from an object being imaged (e.g., a specimen mounted on a substrate) and to focus the light to create an image of the object. In certain embodiments, an objective lens may include a single lens or mirror, or may include a plurality of optical components that are configured to collect light from the object being imaged and to focus the light to create an image of the object. In some embodiments, a microscope may include a motorized component that is configured to modulate a distance between the objective lens and the substrate in accordance with the subject methods.

Objective lenses in accordance with embodiments of the invention may have any suitable numerical aperture (NA). The numerical aperture of an objective lens describes how much of an emitted light signal can be collected by the objective and the diffraction-limited resolution that can be achieved. A higher numerical aperture translates into improved resolution in a wavelength-dependent fashion, according to the relationship defined by the Abbe diffraction limit of $$R = \frac{0.16\lambda}{NA} \approx \frac{\lambda}{2NA}.$$

In some embodiments, the numerical aperture of an objective lens ranges from 0.1 to 1.4, such as 0.15, 0.2, 0.25, 0.3, 0.35, 0.4, 0.45, 0.5, 0.55, 0.6, 0.65, 0.7, 0.75, 0.8, 0.85, 0.9, 0.95, 1.0, 1.05, 1.1, 1.15, 1.2, 1.25, 1.3, or 1.35.

In some embodiments, an optical source may include a laser or a light emitting diode (LED). Optical sources in accordance with embodiments of the invention may be configured to emit light having any suitable wavelength (e.g., may have any suitable emission spectrum), ranging from UV light, to visible light, to infrared light, as described above. In certain embodiments, the subject methods involve shaping a light beam from an optical source to create a collimated light beam. In certain embodiments, one or more optical components may be used to shape a light beam into a collimated light beam. For example, in some embodiments, an optical collimating lens or a collection of lenses may be positioned in the path of a light beam and used to shape the light beam from the optical source into a collimated light beam.

Detection channels in accordance with embodiments of the invention are configured to receive a light beam as an input, and to direct the input light beam to a detector for analysis. In some embodiments, a detection channel may be configured to only allow light of a certain wavelength, or of a certain wavelength range, to enter the detection channel. For example, in some embodiments, a detection channel may include an optical filter that is configured to only allow light of a certain wavelength range to enter the detection channel. In some embodiments, a microscope may include a plurality of detection channels, each having a separate detector associated therewith.

In some embodiments, a detection channel used for autofocusing may include a detector with a photodiode. Photodiodes in accordance with embodiments of the invention are configured to absorb photons of light and convert the light into electrical current that can be measured. In some embodiments, a photodiode may include an optical filter, a lens, or any other suitable components that may be used to convert light energy into electrical current for measurement.

In some embodiments, a detection channel used for imaging may include a detector with an image sensor. Image sensors in accordance with embodiments of the invention are configured to convert an optical image into an electronic signal. Examples of image sensors include, but are not limited to, charge coupled devices (CCDs) and complementary metal-oxide semiconductor (CMOS) or N-type metal-oxide semiconductor devices. In some embodiments, an image sensor may be an active pixel sensor (APS). In certain embodiments, an image sensor may be a color image sensor. In some embodiments, a color image sensor may be configured to collect red, green and/or blue light from a specimen and to generate a composite image of the specimen from the collected red, green and/or blue light.

In some embodiments, a detection channel used for imaging may include a camera. In some embodiments, a camera is a CCD camera or a scientific CMOS camera (sCMOS) providing extremely low noise, rapid frame rates, wide dynamic range, high quantum efficiency (QE), high resolution, and large field of view. Such cameras are commercially available from scientific technology vendors.

Aspects of the subject systems may also include additional components that can be used to control and/or modulate at least a portion of a light beam in the system. Examples of additional components include, but are not limited to, mirrors, lenses, beam splitters, prisms, diffraction gratings, photomultiplier tubes, optical filters, beam shaping optics, and the like.

In some embodiments, aspects of the subject systems include one or more focusing lenses. Focusing lenses in accordance with embodiments of the invention include any lens that is configured to affect the focusing of a light beam in a suitable manner. For example, in some embodiments, a focusing lens is configured to focus a light beam at a desired focal point.

In some embodiments, aspects of the subject systems include one or more spatial apertures. Spatial apertures (also known as spatial filters) in accordance with embodiments of the invention are components that are configured to remove aberrations in a light beam due to imperfections or variations in one or more optical components of the system. In some embodiments, a spatial aperture includes an aperture, or opening, that is placed in the optical path of a light beam and allows a desired portion of the light beam to pass through the aperture, while blocking light that corresponds to an undesired portion or structure of the light beam. Spatial apertures in accordance with embodiments of the invention may include a small circular aperture, or "pinhole" aperture, that allows light to pass through. In some embodiments, a spatial aperture has an aperture whose diameter ranges from 50 µm to 500 µm, such as 100, 150, 200, 250, 300, 350, 400 or 450 µm. In certain embodiments, a spatial aperture may include an aperture whose size is variable, and the subject methods may include varying the size (e.g., varying the diameter) of the spatial aperture. In certain embodiments, a spatial aperture may include an aperture whose size can be varied from 50 µm to 500 µm, such as 100, 150, 200, 250, 300, 350, 400 or 450 µm.

Aspects of the invention include substrates that are rigid or semi-rigid structures made of transparent material. Such materials include, but are not limited to plastic, glass, and/or quartz. In some embodiments, a substrate is a microscope slide made of any suitable material and having any suitable geometry, such as a square, rectangular, circular, oval, or hexagonal geometry.

In some embodiments, a dimension (e.g., a length) of the substrate ranges in size from about 20 mm, up to about 25 mm, up to about 30 mm, up to about 35 mm, up to about 40 mm, up to about 45 mm, up to about 50 mm, up to about 55 mm, up to about 60 mm, up to about 65 mm, up to about 70 mm, up to about 75 mm, up to about 80 mm. In some embodiments, another dimension (e.g., a width) of the substrate ranges in size from about 20 mm, up to about 25 mm, up to about 30 mm, up to about 35 mm, up to about 40 mm, up to about 45 mm, up to about 50 mm, up to about 55 mm, up to about 60 mm, up to about 65 mm, up to about 70 mm, up to about 75 mm, up to about 80 mm. In some embodiments, the thickness of the substrate ranges from about 0.5 mm, up to about 0.8 mm, up to about 1 mm, up to about 1.2 mm, up to about 1.5 mm. In some embodiments, the substrate is a standard microscope slide that is approximately 75 mm in length, 25 mm in width, and 1 mm thick.

In some embodiments, a substrate may include one or more surface coatings or surface treatments, such as those containing polymers (e.g., poly-L-lysine, silane) or proteins (e.g., albumin). In some embodiments, a substrate includes a surface coating or surface treatment that renders at least a portion of the substrate opaque or semi-opaque, such as a frosting or a glazing treatment. In some embodiments, a substrate includes an area that can be used for labeling, such as, e.g., an end or corner region upon which a suitable label can be placed. In some embodiments, a substrate is labeled using labeling equipment, such as, e.g., equipment that applies a label to a surface of the substrate, etches and/or marks the substrate to create a label, or prints or applies ink and/or any other suitable marking material to a surface of the substrate to create a label. In some embodiments, a substrate may include a bar code label that can be used to identify the substrate.

In some embodiments, a substrate includes one or more non-reflective regions on a planar surface of the substrate, and the subject methods involve directing a light beam from an optical source to reflect off a non-reflective region of the substrate. A non-reflective region in accordance with embodiments of the invention may have any suitable shape and dimensions. For example, in some embodiments, a non-reflective region may be circular, oval, square, rectangular or hexagonal in shape. A non-reflective region in accordance with embodiments of the invention may have a dimension (e.g. a diameter or side length) that ranges from 1 to 10 mm, such as 2-5 mm. A non-reflective region in accordance with embodiments of the invention may have any suitable thickness. In some embodiments, the thickness of the non-reflective region may range from 0 to 1 mm, such as 0.1, 0.2, 0.3, 0.4, 0.5, 0.6, 0.7, 0.8 or 0.9 mm. A non-reflective region of a substrate may be created using any suitable technique, including but not limited to: depositing a non-reflective coating on the surface of the substrate; modifying the surface of the substrate, e.g., using etching techniques; and the like.

In some embodiments, aspects of the subject systems include one or more specimens that have been placed on a substrate. Specimens that are amenable to analysis using the subject methods include any type of biological tissue, including but not limited to: solid or semi-solid tissues, biological fluids, cells (e.g., blood cells), biological molecules, and the like. In some embodiments, at least a portion of a specimen may have a variable thickness, wherein the thickness of the portion of the specimen varies across one or more dimensions of the substrate. In some embodiments, at least a portion of a specimen may have an irregular surface, wherein the surface of the portion of the specimen varies across one or more dimensions of the substrate. In some embodiments, at least a portion of a specimen may have a variable reflectance value, wherein the reflectance of the portion of the specimen varies across one or more dimensions of the substrate. In certain embodiments, a specimen may have a variable image content across one or more dimensions of the substrate. For example, in some embodiments, a portion of a specimen may have a first image content (e.g., a portion of a specimen comprising a dense concentration of cells or molecules) and another portion of the specimen may have a second image content (e.g., a portion of the specimen that does not contain any cells or molecules).

In some embodiments, a specimen has been subjected to one or more staining procedures that are adapted to stain or color one or more portions of the specimen in order to facilitate visual analysis of the specimen. In some embodiments, a specimen has been contacted with one or more binding agents that are configured to stably associate with the specimen to facilitate visual analysis of the specimen.

Aspects of the invention include a controller, processor and computer readable medium that are configured or adapted to control or operate one or more components of the subject systems. In some embodiments, a system includes a controller that is in communication with one or more components of the subject systems, as described herein, and is configured to control aspects of the systems and/or execute one or more operations or functions of the subject systems, e.g., to carry out one or more methods described herein. In some embodiments, a system includes a processor and a computer-readable medium, which may include memory media and/or storage media. Applications and/or operating systems embodied as computer-readable instructions on computer-readable memory can be executed by the processor to provide some or all of the functionalities described herein.

In some embodiments, a system includes a user interface, such as a graphical user interface (GUI), that is adapted or configured to receive input from a user, and to execute one or more of the methods as described herein. In some embodiments, a GUI is configured to display data or information to a user.

Figure 3:
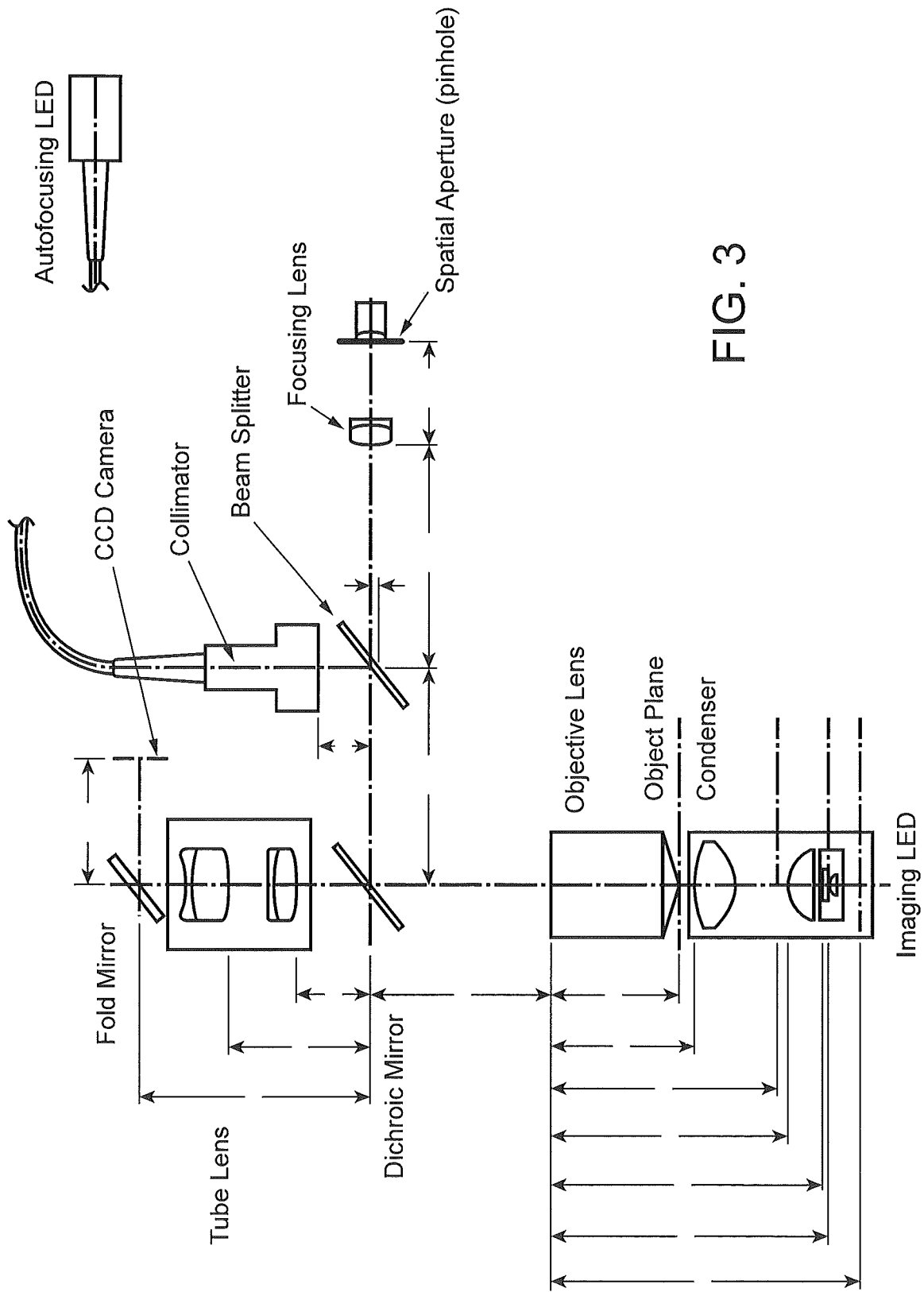
FIG. 3 is a schematic illustration of an optical system in accordance with embodiments of the invention.

Referring now to FIG. 3, portions of a microscope system in accordance with embodiments of the invention are depicted. The depicted system includes an autofocusing LED, an imaging LED, a CCD camera, a collimator, a focusing lens, a spatial (pinhole) aperture, an objective lens, as well as various other optical components configured to carry out the subject methods.

Figure 4:
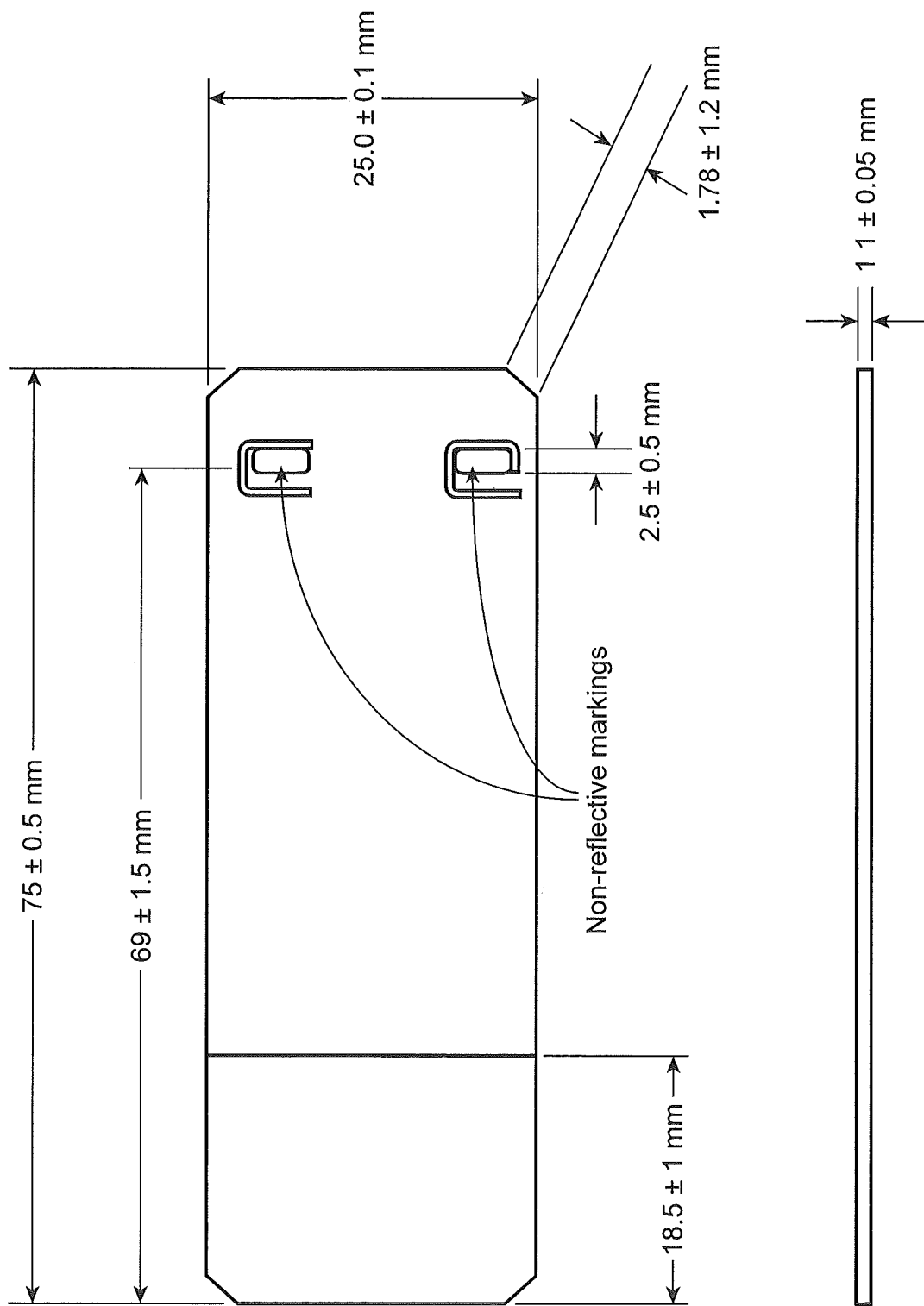
FIG. 4 is an illustration of a substrate including two non-reflective markings.

Referring now to FIG. 4, a substrate in accordance with embodiments of the invention is shown. The depicted substrate includes two non-reflective regions. Examples of suitable dimensions are depicted, but are in no way intended to limit the dimensions of substrates that can be used in systems and methods in accordance with embodiments of the invention.

EXAMPLES

Example 1

Automatically Focusing a Microscope on a Specimen and Collecting a Focused Digital Image of the Specimen A biological specimen is placed on an upper side of a substrate that includes two non-reflective regions, as depicted in FIG. 4. The specimen is subjected to a staining procedure that stains a plurality of cells in the specimen to facilitate their visual identification. The substrate is then placed on the specimen holder of a microscope system, as depicted in FIG. 3, and an automatic focusing procedure is initiated on a computer processor that is configured to control the system and carry out an automated focusing procedure.

The processor directs a first light beam from an optical source to reflect off a reflective portion of the substrate (i.e., a position other than one of the two non-reflective regions of the substrate). The reflected light beam is directed to a detection channel that includes a photodiode detector, and the intensity of the reflected light beam is measured in photodiode counts. The measured intensity exceeds a threshold intensity value, and the processor therefore determines that the substrate is present in the microscope.

The processor then directs a second light beam from an optical source of the microscope to reflect off one of the non-reflective regions of the substrate. While the first and second reflected light beams are both reflecting off the substrate, the distance between the substrate and the objective lens is varied by moving the substrate and/or the objective lens. Each of the reflected light beams is directed to a detection channel that includes a photodiode, and the intensity of the two reflected light beams is measured by the photodiode. The intensity measurement of the two reflected light beams are compared to each other, and the difference is measured. The difference between the two reflected light beams is determined to exceed a threshold value, thereby confirming that the substrate is correctly positioned in the microscope for imaging analysis.

A relative maximum, or peak, in the measured intensity profile of the first reflected light beam is measured as a function of the position of the substrate in the optical axis of the microscope, as depicted in FIGS. 1 and 2. The intensity measurement having the peak value is determined to be the measurement having an optimal focal value, and the substrate is moved to a position in the optical axis of the microscope located above or below the peak position at a distance equal to a half of the uncertainty interval.

Next, the number of digital images of the specimen that should be taken in order to identify an image having an optimal focus metric is determined. This is accomplished by dividing the uncertainty interval of the initial focus position by the depth of field of the objective lens of the microscope, yielding a number that ranges from 1 to 10.

The substrate is moved along the optical axis of the microscope in steps that are the same size as the depth of field of the objective lens, and the calculated number of images is collected using an imaging sensor. Each of the collected images is analyzed to determine an intensity value of the image on a pixel by pixel basis. The results of the analysis of each image are compared and the image having an optimal focus metric (e.g., having the highest measured intensity value on a pixel by pixel basis) is selected as the best image. The substrate is then moved to a position in the optical axis of the microscope that corresponds to the position of the image with the optimal focus metric, thereby automatically focusing the microscope on the specimen.

The entire process of determining the presence of the substrate in the microscope, determining whether the substrate is in a suitable orientation for analysis, collecting the required number of digital images of the specimen and focusing the microscope on the specimen is conducted in less than 2 seconds.

Although the foregoing invention has been described in some detail by way of illustration and example for purposes of clarity of understanding, it is readily apparent to those of ordinary skill in the art in light of the teachings of this invention that certain changes and modifications may be made thereto without departing from the spirit or scope of the appended claims.

Accordingly, the preceding merely illustrates the principles of the invention. It will be appreciated that those skilled in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. The scope of the present invention, therefore, is not intended to be limited to the exemplary embodiments shown and described herein. Rather, the scope and spirit of present invention is embodied by the appended claims.

What is claimed is:

1. A method for automatically analyzing a substrate orientation in a microscope, the method comprising:
   placing a substrate substantially perpendicular to an optical axis of the microscope, wherein the substrate comprises a planar surface;
   directing a light beam from an optical source to sequentially reflect off a first position and a second, different position on the planar surface to generate two reflected light beams, wherein the first position comprises a non-reflective region and the second position comprises a reflective region;
   varying a distance between the substrate and an objective lens of the microscope;
   collecting a plurality of measurements of one or more characteristics of the two reflected light beams with a detector, wherein each of the plurality of measurements is collected when the substrate is in a different position along the optical axis of the microscope with respect to the objective lens;
   determining whether the measurements of the two reflected light beams differ from one another by an amount that exceeds a threshold value;
   determining that the substrate is correctly oriented in the microscope if the measurements of the two reflected light beams differ from one another by an amount that exceeds the threshold value; and
   determining that the substrate is incorrectly oriented in the microscope if the measurements of the two reflected light beams do not differ from one another by an amount that exceeds the threshold value.

2. The method according to claim 1, wherein collecting the plurality of measurements of one of more characteristics of the two reflected light beams comprises measuring an intensity of the two reflected light beams.

3. The method according to claim 2, comprising placing a focusing lens and a spatial aperture in front of the detector.

4. The method according to claim 1, wherein the light beam from the optical source comprises ultraviolet (UV) light, visible light, or infrared (IR) light.

5. The method according to claim 1, wherein the substrate comprises a glass slide.

6. The method according to claim 1, wherein the optical source comprises a laser.

7. The method according to claim 1, wherein the optical source comprises a light emitting diode (LED).

8. The method according to claim 1, comprising shaping the light beam from the optical source to create a collimated light beam.

9. The method according to claim 1, wherein varying the distance between the substrate and the objective lens comprises moving the substrate and/or the objective lens at a variable rate.

10. The method according to claim 1, wherein varying the distance between the substrate and the objective lens comprises moving the substrate and/or the objective lens at a constant rate.

11. The method according to claim 1, wherein an amount of time required to automatically analyze the substrate orientation in the microscope is 1 second or less.

12. The method according to claim 2, wherein the threshold value used to determine whether the substrate is present in the microscope ranges from 40-510 nA.

13. The method according to claim 6, wherein the laser has an emission wavelength within a spectral range of 360 nm to 1,000 nm.

14. The method according to claim 1, wherein an intensity of the two reflected light beams is measured by a photodiode.

15. The method according to claim 1, wherein directing the light beam from the optical source to reflect off the substrate to generate a reflected light beam comprises reflecting the light beam from a front surface of the substrate facing the objective lens.

16. The method according to claim 1, wherein the non-reflective region has a circular, oval, square, rectangular, or hexagonal shape.

17. The method according to claim 1, wherein the non-reflective region has a dimension that ranges from 1 to 10 mm.

18. The method according to claim 1, wherein the further comprises measuring a maximum peak of the first reflected light beam, wherein the maximum peak of the first reflected light beam is measured as a function of the position of the substrate in the optical axis of the microscope.

19. The method according to claim 9, wherein the variable rate comprises a first rate, ranging from 100-500 μm/s for a first period of time; and a second rate ranging from 100-500 μm/s for a second period of time.

20. The method according to claim 10, wherein the constant rate ranges from 100-500 μm/s.

* * * * *